United States Patent [19]

Hansen

[11] Patent Number: 4,788,640
[45] Date of Patent: Nov. 29, 1988

[54] PRIORITY LOGIC SYSTEM

[75] Inventor: Richard B. Hansen, Aptos, Calif.

[73] Assignee: Intel Corporation, Santa Clara, Calif.

[21] Appl. No.: 819,726

[22] Filed: Jan. 17, 1986

[51] Int. Cl.[4] .................. G06F 3/14; G06F 12/14; G06F 13/00; G06F 13/26
[52] U.S. Cl. .................................. 364/200; 364/521
[58] Field of Search ............... 364/200 MS File, 300, 364/900 MS File

[56] References Cited

U.S. PATENT DOCUMENTS

| 3,444,525 | 5/1969 | Barlow et al. | 364/200 |
|---|---|---|---|
| 3,706,974 | 12/1972 | Patrick et al. | 364/200 |
| 3,905,025 | 9/1975 | Davis et al. | 364/200 |
| 3,921,150 | 11/1975 | Scheuneman | 364/900 |
| 3,925,766 | 12/1975 | Bardotti et al. | 364/200 |
| 4,006,466 | 2/1977 | Patterson et al. | 364/200 |
| 4,035,780 | 7/1977 | Kristick et al. | 364/200 |
| 4,091,455 | 5/1978 | Woods et al. | 364/200 |
| 4,099,234 | 7/1978 | Woods et al. | 364/200 |
| 4,126,893 | 11/1978 | Cronshaw et al. | 364/200 |
| 4,271,466 | 6/1981 | Yamamoto et al. | 364/200 |
| 4,323,967 | 4/1982 | Peters et al. | 364/200 |
| 4,385,350 | 5/1983 | Hansen et al. | 364/200 |
| 4,400,771 | 8/1983 | Suzuki et al. | 364/200 |
| 4,454,575 | 6/1984 | Bushaw et al. | 364/200 |
| 4,488,218 | 12/1984 | Grimes | 364/200 |
| 4,493,036 | 1/1985 | Boudreau et al. | 364/200 |
| 4,558,412 | 12/1985 | Inoshita et al. | 364/200 |
| 4,644,467 | 2/1987 | McCarthy | 364/200 |

FOREIGN PATENT DOCUMENTS 0097499 4/1984 European Pat. Off. ............ 364/200

OTHER PUBLICATIONS

8-Bit Microprocessor & Peripheral Data, Series C., Motorola Inc., 1983, pp. 3-410, 3-418, 3-420 to 3-424.
Hughes et al., "Control Program for Providing Priority Tasking", IBM Technical Disclosure Bulletin, vol. 22, No. 11, (Apr. 1980), pp. 5134-5137.
Roberts et al., "Adjusting Priority of Memory Operations," IBM Technical Disclosure Bulletin, vol. 22, No. 2 (Jul. 1979), pp. 804-806.

Primary Examiner—Raulfe B. Zache
Assistant Examiner—Robert B. Harrell
Attorney, Agent, or Firm—Blakely, Sokoloff, Taylor & Zafman

[57] ABSTRACT

An improved priority logic scheme for setting priority values determining priority of interrupts. Multi-level priority allows for varied priority values for single word and multiple-word block segment transfers. Registers allow for programmable priority values which can modify priority values during operation. Simplicity of the invention provides for priority circuitry which does not depend on clock cycles. Flexiblity of the circuitry allows for additional devices to be implemented within the scheme. The invention is described as developed in a single semiconductor chip with other processors to provide a single graphics chip capability.

21 Claims, 6 Drawing Sheets

TRUTH TABLE

| REQ IN | ST | MATCH | REQ OUT | REMARK |
|---|---|---|---|---|
| 0 | X | X | 0 | NO REQUEST SITUATION |
| 1 | 0 | 0 | 0 | PRIORITY TO ANOTHER LINE |
| 1 | 1 | 0 | 1 | PROPAGATE REQUEST |
| 1 | 0 | 1 | 1 | ALL ZERO SITUATION |
| 1 | 1 | 1 | IMPOSSIBLE | WILL NEVER OCCUR |

PRIORITY LOGIC SYSTEM

BACKGROUND OF THE INVENTION

1. Field of the Invention.

The invention relates to the field of priority interrupt systems in a data processing network.

2. Prior Art.

Many interrupt schemes have been implemented in the past to control the accessing of data in a computerized system. Fixed, as well as programmable, priority interrupt systems are available. As data acquisition rates increase with faster processors and the emergence of the 32-bit processors, faster priority interrupt schemes are needed. Earlier schemes allowed single word transfers only. That is, the system would look for an interrupt and allow a one word transfer per interrupt. This scheme is deemed to be slow in that appreciable finite time is required for handling each interrupt and also in that the system must respond to each interrupt as though it is coming from a separate device.

One means of increasing the speed of the acquisition rate involves block segment transfers. Block segments containing multiple words are transferred to a single device. Typically, a block transfer interrupt signal will lock out the system, such that only one device can access the memory during a complete block transfer. However, this scheme prevents interrupts from occurring during the block transfer.

The present invention allows for both single and multiple word (block segment) tranfers of data between a device and a memory. The present invention represents a departure from previous technologies and describes a scheme wherein a priority logic unit provides for two levels of priority depending on the type of transfer desired. A modified priority scheme also allows for uninterrupted block segment transfers as well as interrupted block segment transfers.

SUMMARY OF THE INVENTION

An improved priority logic scheme utilizing two levels of priority is described. The first level of priority is used during a single word transfer while a second level of priority is used during a block segment transfer. Normally the system operates in the first level (open priority level) mode but shifts to the second-level (modified priority level) when it detects a block segment transfer. Registers store programmable priority values for each device and these values determine the priority order of incoming requests for data transfer.

By programming priority values accordingly, interruptable or uninterruptable block segment transfers may be accomplished. The scheme is flexible allowing for a system designer to choose the trade-off between bus latency versus bus speed and performance.

Further, the flexibility of the scheme also resides in its simplicity. The priority logic scheme is implemented in combinatorial logic circuitry such that priorities can be established independent of clock cycles. Also, the priority logic circuitry is implemented in cells, wherein additional cells may be employed for additional devices.

The present invention was designed for the purpose of developing a single semiconductor integrated circuit chip containing a graphics processor (GP), a display processor (DP) and a bus interface unit (BIU) to manipulate 32-bit data transfers. GP is described in copending application Ser. No. 825,652 filed Jan. 16, 1986, DP is described in copending application Ser. No. 828,626 filed Feb. 10, 1986. The present invention located within the bus interface unit controls priority of data transfer between GP, DP as well as external devices such as a central processing unit (CPU), and memory.

Accordingly, an object of the invention is to provide a two-level priority scheme, wherein priority values determine the order of priorities.

Another object of the invention is for allowing a device to possess one priority value during a single word transfer and a second priority value during a block segment transfer.

Another object of the invention is to provide a programmable as well as a modifiable priority scheme, wherein priority values may be manipulated by the system designer in real time.

A further object of the invention is to provide a multiple cell circuitry design, so as to provide flexibility in the number of devices which may be coupled to the priority logic unit.

A further object of the invention is to provide a single semiconductor chip which includes the priority logic system along with a graphics processor and a display processor.

BRIEF DESCRIPTION OF THE DRAWINGS

FIG. 6a is a schematic diagram of one cell of the priority logic unit.

FIG. 6b is a truth table diagram containing the logic states of FIGS. 6a.

DETAILED DESCRIPTION OF THE INVENTION

A priority logic scheme utilizing two levels of priority is disclosed. The normal or open-level priority (OPL) is normally used for single word transfers. Whenever a multiple word block segment transfer occurs, a modified-level priority (MPL) is used. A circuit detects a second word in a block segment transfer and switches from OPL to MPL mode. The transition to an MPL mode places a different priority on block segment transfers preventing monopolization of the memory by a single memory accessing device.

Figure 1:
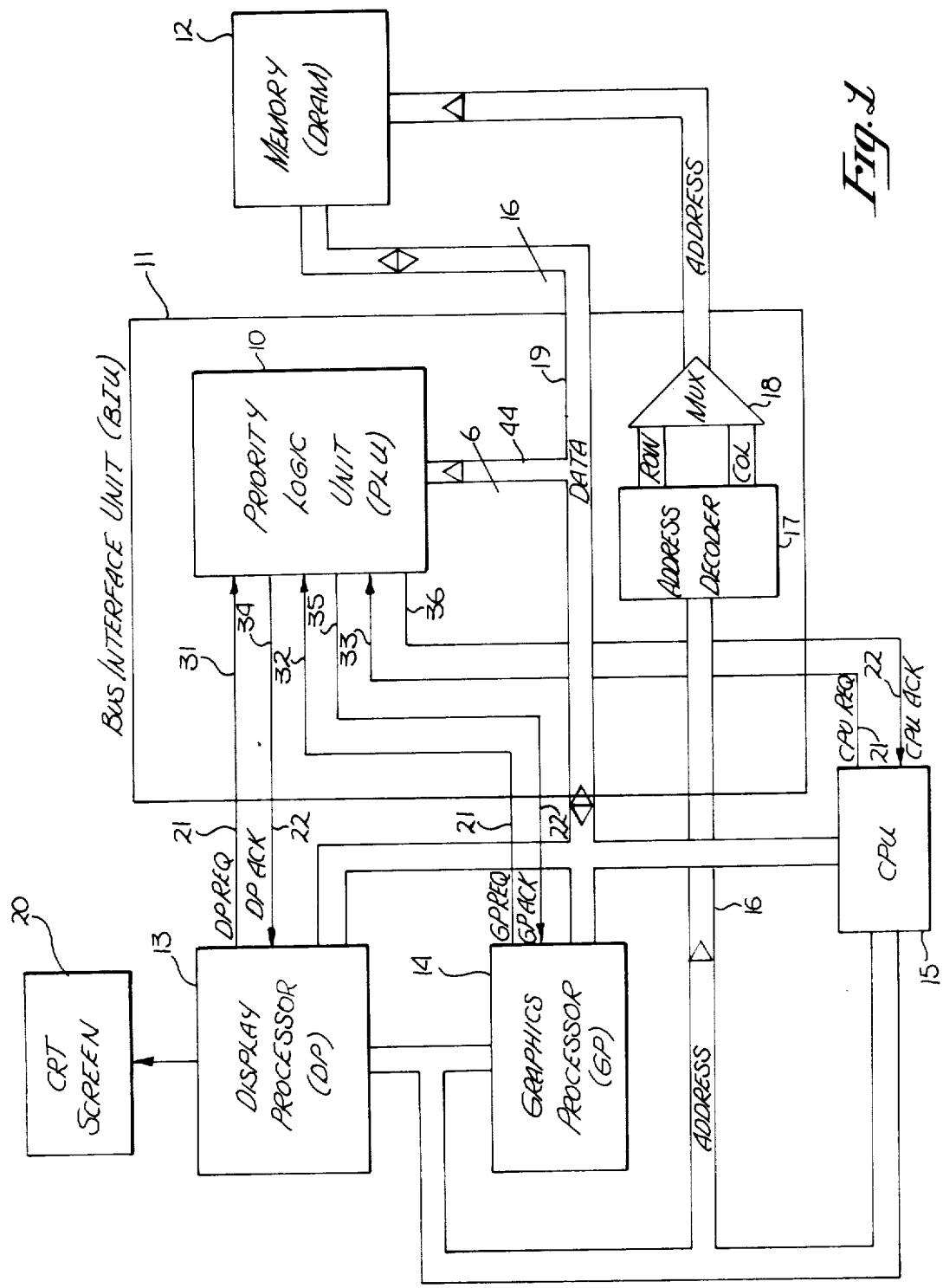
FIG. 1 is a block diagram illustrating the overall function of the priority logic unit.

FIG. 1 depicts a basic block diagram of the priority logic unit (PLU) 10 in relation to other units in a data processing network. The PLU 10 is located within bus interface unit (BIU) 11. The BIU 11 interfaces memory 12 to memory accessing units, such as the display processor (DP) 13, graphics processor (GP) 14 and central processing unit (CPU) 15. The processors 13, 14 and 15 address memory 12 by address bus 16. Within the BIU 11, address decoder 17 decodes row and column information and multiplexer 18 transfers the decoded information to memory 12. Data bus 19 having a data path through the BIU 11 transfers data between processors 13, 14 and 15 and memory 12. Numerous examples of address decoders for decoding row and column information are known in the art which may be utilized as address decoder 17.

In the preferred embodiment, data bus 19 is a 16-bit bus of which 6 bits are connected to PLU 10. Memory 12 is a dynamic random access memory (DRAM) allowing for a 16-bit word to be accessed for a single transfer or two 16-bit words for a doubleword transfer by address bus 16. As a result, a 32-bit data transfer occurs on a 16-bit data bus 19 during a block transfer. BIU 11 also allows single word and block segment transfers of data.

CPU 15 is a typical processor associated with most computers. GP 14 is a video data processor providing graphics data manipulation. DP 13 is a processor controlling the display on CRT screen 20. Each processor has a request line 21 and acknowledge line 22 connected to PLU 10. Each request line 21 requests access to buses 16 and 19. PLU 10 determines which request has the highest priority and allows access to the highest priority requesting unit by signalling on the respective acknowledge line 22, wherein that unit gains access to memory 12 until a higher priority interrupts or the bus cycle is completed.

In the preferred embodiment, DP 13 and GP 14 are incorporated in the same semiconductor chip as the BIU 11, although such a requirement is not necessary to practice the invention. Further, any number of memory accessing units may be coupled to PLU 10, as well as any type or configuration of memory and access buses may be used.

Although the present invention is utilized for providing graphics processing, it will be obvious to one skilled in the art that these specific details are not required to practice the present invention. In other instances, well-known structures, circuits, and control lines are not described in detail in order not to obscure the present invention in unnecessary detail.

Figure 2:
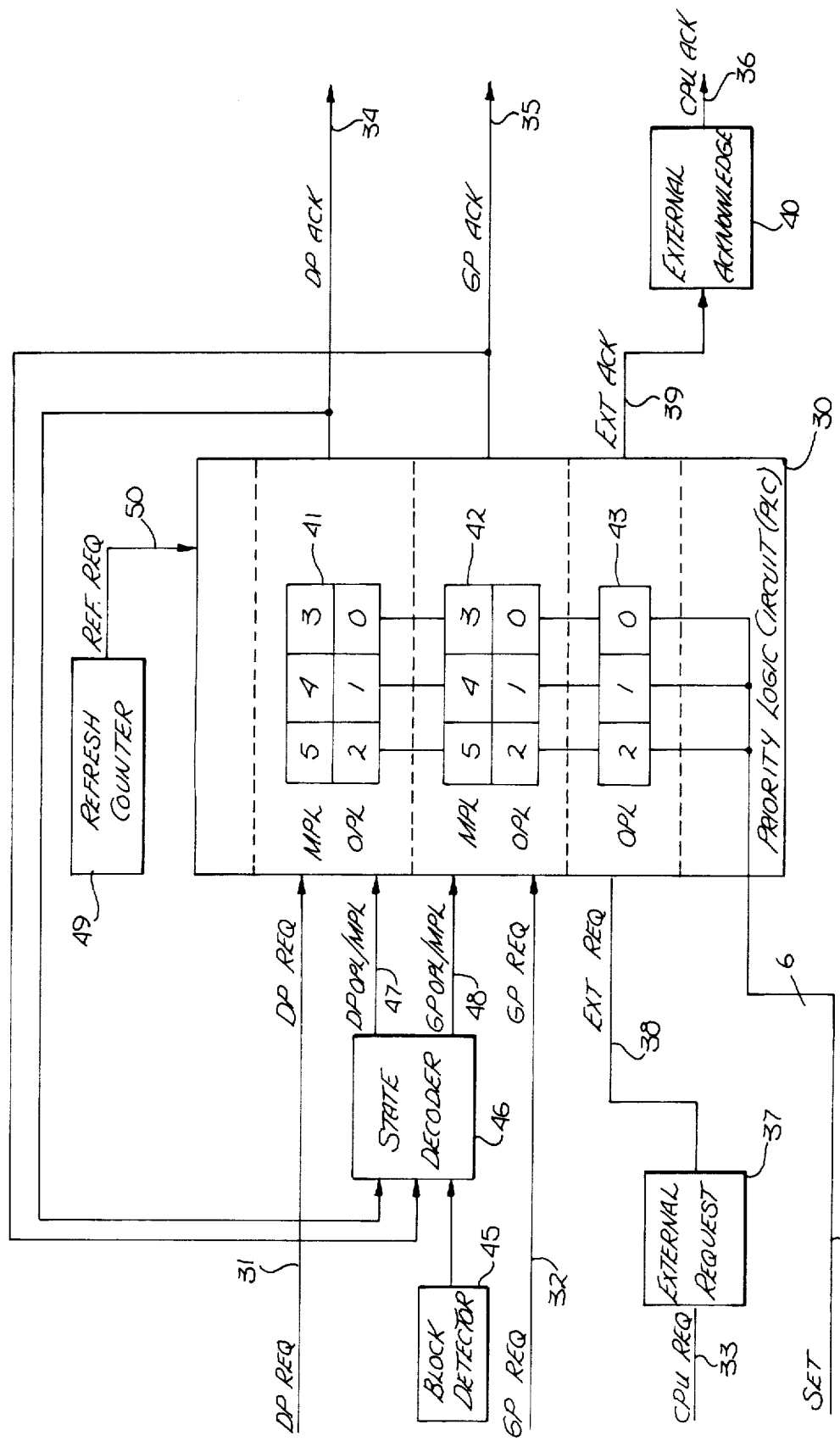
FIG. 2 is a functional block diagram of the priority logic unit.

FIG. 2 shows an enlargement of PLU 10. Request lines DP REQ 31 and GP REQ 32 are coupled with priority logic circuit (PLC) 30 and respective acknowledge lines DP ACK 34 and GP ACK 35 exit PLC 30. CPU request line, CPU REQ 33, is coupled with external request module 37 which then provides EXT REQ 38 signal to PLC 30. In return, PLC 30 generates EXT ACK 39 to external acknowledge module 40 which generates CPU ACK 36. The external modules 37 and 40 allow for multiple external devices to interface to the PLC 30. Alternatively, such devices may be coupled directly to the PLC 30. In the preferred embodiment, request and acknowledge lines 31, 32, 34 and 35 are treated as internal lines because they are totally within a single semiconductor chip.

PLC 30 contains registers 41, 42 and 43 for storing priority bits which are programmed in as a 6-bit code on data line 44 which is coupled to registers 41, 42 and 43. Registers 41, 42, 43 are used for storing priority values. DP register 41 and GP register 42 each contain 6 bits. The three last significant bits are used to set priority values when in the OPL mode and the three most significant bits are used to set priority values when in the MPL mode.

Block detector 45 detects a block transfer and informs state decoder 46. State decoder 46 also receives DP ACK 34 and GP ACK 35 signals. State decoder 46 generates DP OPL/MPL signal 47 which selects either MPL value or OPL value of DP register 41. During any single word transfer, the OPL value is selected. During any block segment transfer, the OPL value is selected for the very first word, but MPL is then selected for any subsequent word on the same block segment. DP ACK signal 34 informs state decoder 46 when the OPL to MPL transition is to occur in the block segment.

In the same manner, state decoder 46 generates GP OPL/MPL signal 48 which selects either MPL value or OPL value of GP register 42. Single word and initial word of a block sgment use an OPL value and a MPL valve is selected for subsequent words of the block segment.

External register 43 maintains an OPL value only, because in the preferred embodiment only single word transfers are allowed by the CPU. However, by utilizing 6 bits in register 43, a MPL value can be used in conjunction with block transfers.

Refresh counter 49 counts timing clock pulses and generates a REF REQ 50 signal to PLC 30 which initiates a memory refresh cycle that has the highest priority and overrides all acknowledge signals 34, 35 and 39.

Figure 3A:
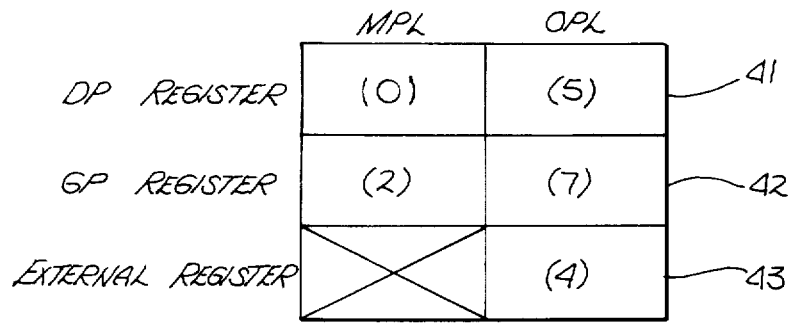
FIG. 3a is an example illustrating the OPL and MPL contents within the priority registers.
Figure 3B:
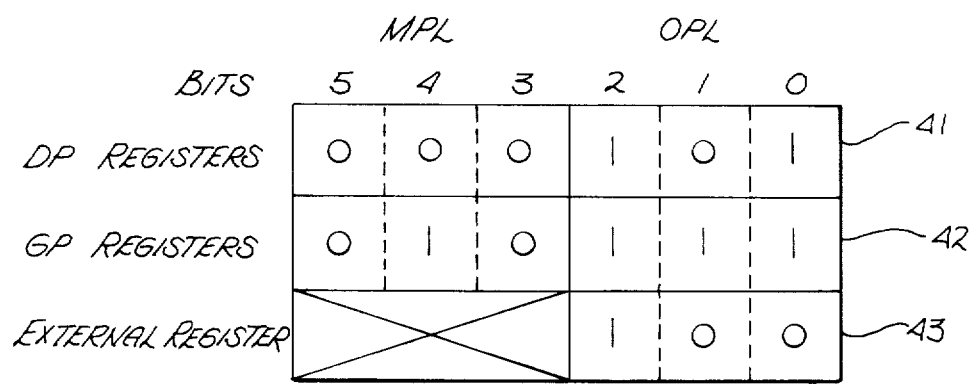
FIG. 3b illustrates the bit storage patterns within the priority registers.

FIGS. 3a and 3b better illustrate the layout of registers 41, 42 and 43. Strictly for explanatory purposes, arbitrary priority values have been selected for each OPL and MPL value in FIG. 3a. These values may be changed at any time by programming new values onto data line 44 of FIG. 2. Priority precedent is determined by the higher numerical value selected. Because only three bits are used in the preferred embodiment, priority values of 0–7 are available. More bits can be used if larger number of priority setting master units are desired. Hence, in this particular example using three masters, GP OPL has the highest priority and DP MPL has the lowest priority in FIG. 3a. The individual values are translated into a bit sequence in FIG. 3b.

Figure 4A:
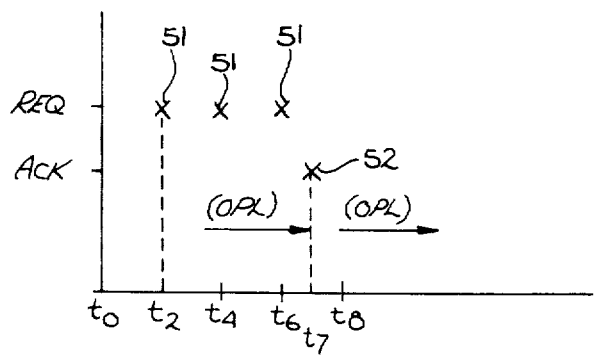
FIG. 4a is a graphic illustration of a priority sequence during a single word transfer.
Figure 4B:
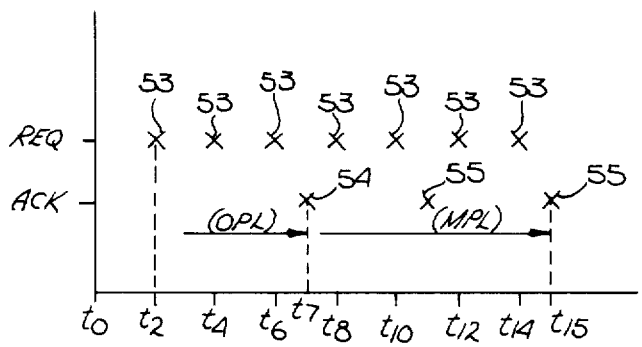
FIG. 4b is a graphic illustration of a priority sequence during a block segment transfer.
Figure 4C:
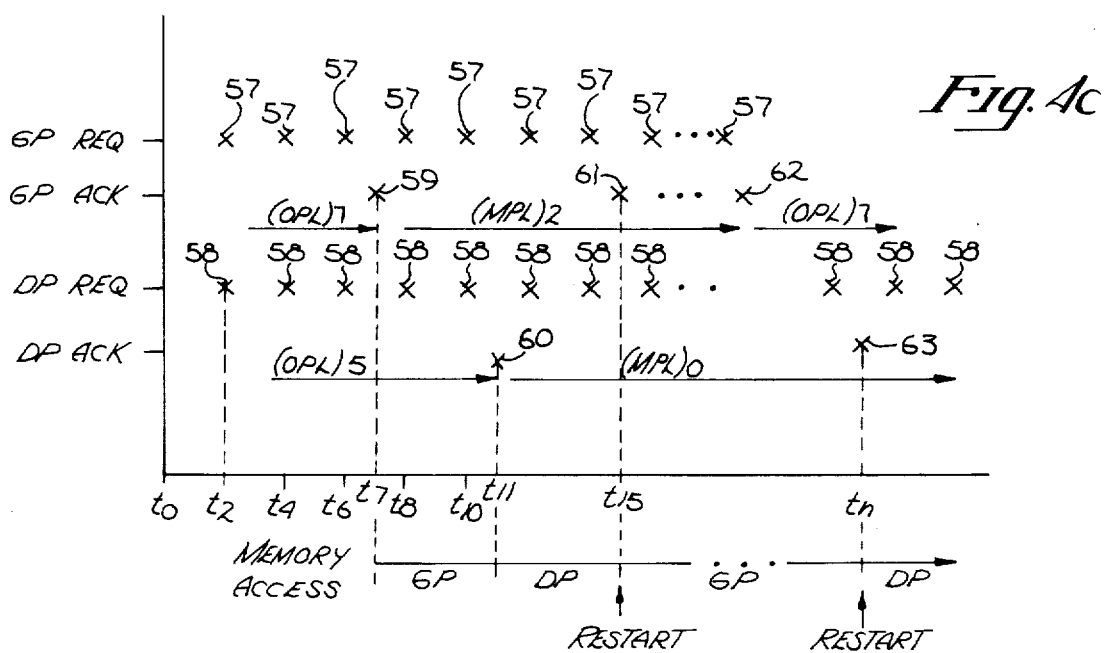
FIG. 4c is a graphic illustration of a combination of two block segment transfers utilizing two levels of priority.

FIGS. 4a, 4b, and 4c illustrate the primary functioning process of the present invention. A single word transfer is shown in FIG. 4a. A request 51 on any request line will signal to the PLC 30 that a device is attempting to access memory 12. A request signal may be continuous or pulsed, but the request will persist until an acknowledge 52 is given. Because this is a single word transfer, request 51 will terminate upon generation of an acknowledge 52. After the generation of an acknowledge 52, the single word is transferred. Also because of the single word request, the request line is given an OPL value for that device and retains an OPL value after the transfer.

FIG. 4b shows a block segment transfer. Request 53 informs PLC 30 that a device is requesting memory access. With a new request, PLC 30 is set to receive a single word or a block request. Hence, a priority of an OPL value is initially available. At this point, acknowledge 54 is given followed by a word transfer. Up until this point, the block transfer sequence is the same as that of a single word transfer. But, because this is a block transfer, request 53 continues to persist requesting the next word in the block.

At this juncture, state decoder 46 selects the MPL mode and PLC 30 selects the MPL value. As long as other devices are not attempting to interrupt by requesting its own access of memory, subsequent acknowledges 55 will allow transfer of subsequent words in the block until all words in the block are transferred. When block segment transfer is completed and request 53 terminates, PLC 30 reverts from the MPL to the OPL mode.

FIG. 4c illustrates the situation when a block segment transfer from one device is interrupted by a request from a second device. For simplicity of explanation, the priority values from FIG. 3 are used.

Initially, GP and DP are requesting access to memory by initiating requests 57 and 58 to PLC 30. When PLC 30 is ready, it responds to the higher level priority, which in this case is the GP request having a priority of 7 as compared to DP value of 5. Acknowledge 59 allows for the first word to be transferred to the GP at time $t_7$. Because request 57 continues, the state decoder 46 interprets this as a block transfer and notifies PLC 30 to select the MPL value.

Because DP OPL value of 5 is higher than the GP MPL value of 2, PLC 30 will respond to the DP request 58. Acknowledge 60 allows for the transfer of the first word of the DP block segment at time $t_{11}$. Upon this transfer, DP priority value shifts to the MPL value. Now GP request 57 is at priority 2 and DP request is at priority 0. The next acknowledge 61 transfers the next word in a GP block segment. Unless a higher value priority interrupts the sequence, GP block transfer will continue until completed with the last acknowledge 62. At the completion of the GP block segment transfer, GP priority reverts to the OPL value, but because GP request 57 is no longer present, DP block transfer restarts with acknowledge 63 at time $t_n$.

The flexibility of the invention resides in the ability of the system user to program the varied priority values. Further, priority values may be modified during operation, however, each modification, as well as restart of a block segment, requires appreciable time which is taken from the actual transfer cycle. Therefore, during retrace cycle of the display, both DP priorities may be set to low values and GP MPL values may be set high to allow for optimum block transfer of graphics information between GP and memory. The system designer will need to consider the trade-off of the flexibility of manipulating priority values versus cycle time pause for restarting a block segment transfer.

Figure 5:
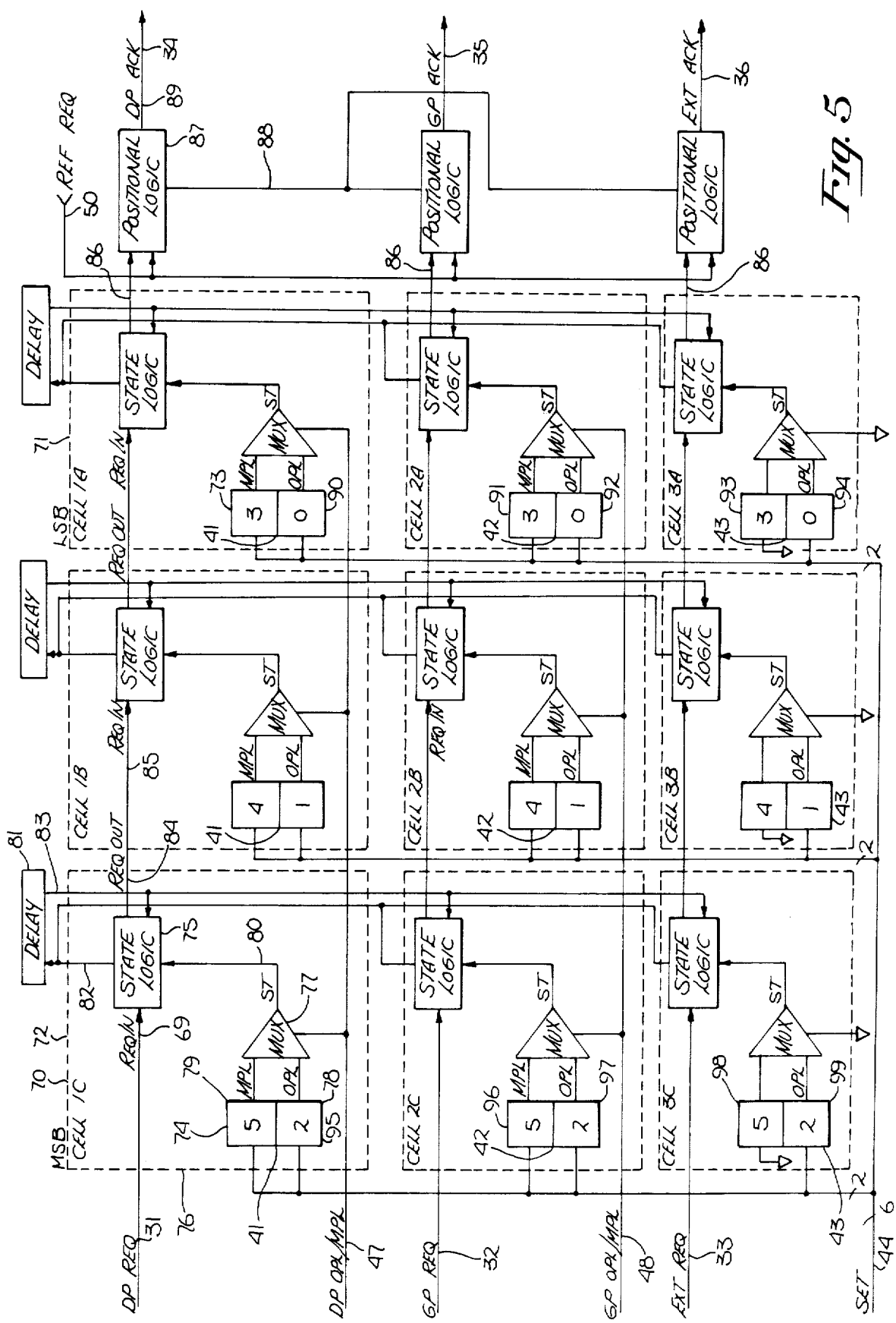
FIG. 5 is a schematic diagram of the priority logic unit.

The circuitry of PLC 30 is shown in FIG. 5. PLC 30 consists of a number of cells 70, the quantity depending on the number of priority bits and request lines. Each row of cells 70 is associated with a request line and each column of cells 70 is associated with a bit level column. Column A 71 contains the lowest significant bits 73, 90, 91, 92, 93 and 94 of each priority level (bits 0 and 3) of registers 41, 42 and 43, while column C 72 contains the most significant bits 74, 95, 96, 97, 98 and 99 (bits 2 and 5). Set line 44 sets the priority bit values of registers 41, 42 and 43.

Referring to the DP REQ 31 signal of FIG. 5, REQ IN 69 enters state logic circuit 75 of MSB cell (1C) 76. A signal of "1" is present if there is a request and a "0" if no request. DP OPL/MPL 47 controls MUX 77 which selects either the OPL bit 78 or the MPL bit 79. Whichever value is selected is coupled to state logic circuit 75 as state signal ST 80. ST 80 is coupled to a delay network 81 on line 82 when DP REQ 31 is a "1". Delay network 81 generates MATCH 83 signal which is a delayed complement of ST 80. Line 82 and MATCH 83 are wired ORed to state logic circuit 75 of the same cell column. State logic circuit 75 processes all three signals, 31, 80 and 83 and generates REQ OUT 84 which becomes the input REQ IN 85 with the next lower cell column.

The same process as above is repeated in each cell. The output 86 of LSB cell 71 is coupled to a positional logic circuit 87. The positional logic circuit 87 is wired ORed to other positional logic circuits 87 by line 88. REF REQ 50 is also coupled to positional logic circuit 87. Positional logic circuit 87 then generates an acknowledge 89 signal as its output.

In the preferred embodiment no block transfers are allowed for external devices. Thus, cells 70 in the third row only allow OPL values to transition through the MUX 77. However, third row cells 70 can be made to function with both priority levels by simple reconfiguration.

Figures 6A, 6B:
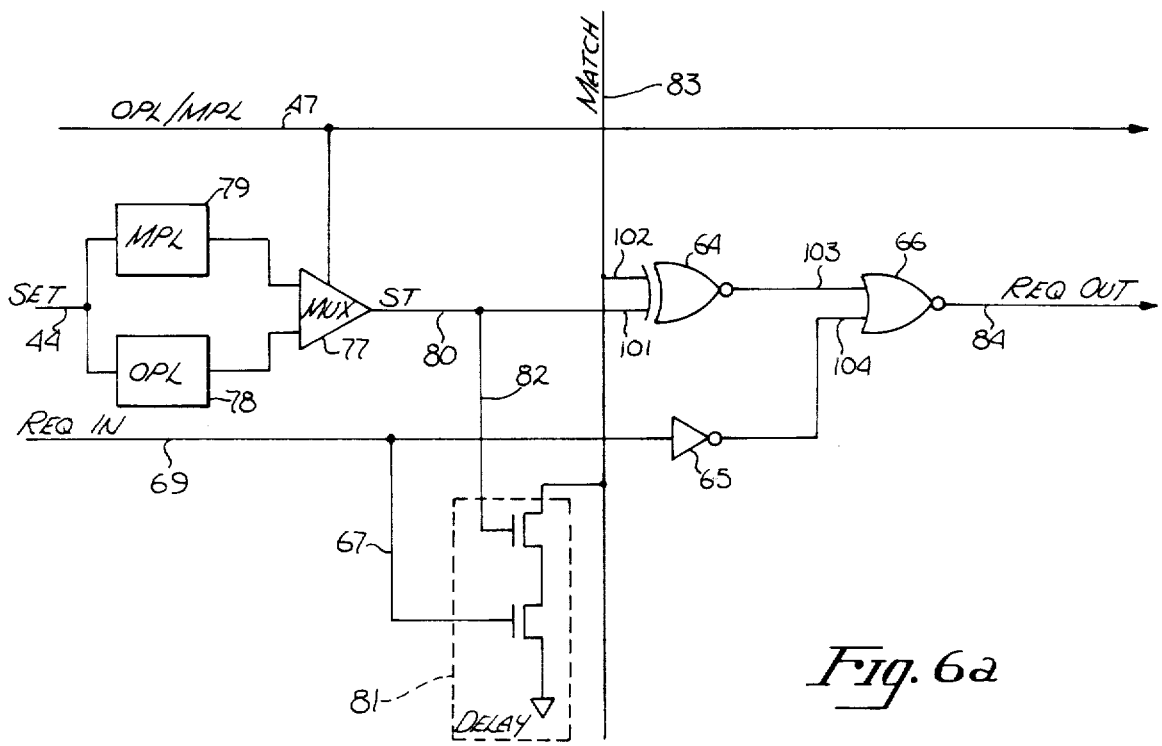

Also referring to FIGS. 6a and 6b, FIG. 6a shows an expanded logic circuit of state logic circuit 75. Set line 44 sets MPL bit 79 and OPL bit 78. OPL/MPL 47 controls MUX 77 to select one of the bits 78 or 79. REQ IN 69 is coupled to inverter 65 and to enable line 67 of delay network 81. Output of MUX 77 is coupled to one input 101 of exclusive NOR gate 64 and also to a second enable line 82 of delay network 81. Delay network 81 is a built-in gate delay for the purpose of allowing the ST 80 to stabilize prior to latching MATCH 83. Normally, MATCH 83 is at a one state. When any cells 70 within a column generates an ST 80 of one, the MATCH 83 for that column transitions to a zero state if a request REQ IN 69 of "1" is present. MATCH 83 is coupled to input 102 of gate 64. Output of gate 64 and output of inverter 65 are coupled as inputs 103 and 104 of NOR gate 66. Output of NOR gate 66 is REQ OUT 84. The circuitry in other state logic circuits incorporate the same design. In practice, any circuit configuration providing the same logical truth table will suffice.

FIG. 6b is a truth table for cells 70. A no request situation shown in line 1 of FIG. 6b. Because there is no request, the output will always be "0". Line 2 shows a condition where ST 80 is "0" and MATCH 83 is "0". Here the priority value ST is "0", but another cell in parallel has a priority value of "1" pulling the MATCH 83 to "0". Because the parallel cell has a higher value priority, that cell wins. Thus, the output of the first cell propagates a "0". Line 3 is a condition when the priority value is a "1", and thus the cell propagates the request as well as pulling MATCH to "0". Line 4 is an all "0" situation, that is, all cells 70 in the column have a priority value of "0". In this instance, MATCH stays at "1" and the request is propagated. The last line is an impossible condition which will never occur, because MATCH will always be "0" when ST and REQ IN have a value of "1".

In operation, a request on REQ IN 69 will continue to propagate a request (a "1" state) as long as each cell has a selected priority bit which is equal to or higher than the selected priority bit in a parallel cell of another requested line. After sequencing through each set of columns, the request having the highest priority value stored in the registers will generate a "1" as the output of its LSB cell 71 on output line 86.

In some configurations involving an equal priority situation, a "1" will be generated on more than one output line 86. In this instance, positional logic circuit 87 has a built-in priority level determining circuit which allows only one device to obtain access. Line 88 wire ORs the positional logic circuit 87 and disables other positional logic circuits 87 which have a built-in lower priority. The cell 70 circuitry or other well-known tie-breaking circuitry may be implemented in positional logic circuit 87. Thus only one acknowledge signal will be generated for any given memory transfer.

REF REQ 50 is used to generate a memory refresh cycle and has the highest priority. Therefore, whenever REF REQ 50 is at a "1" state, it disables positional logic circuit 87 and prevents generation of all acknowledges until the memory refresh cycle is over.

Thus, an improved priority logic scheme implementing two levels of priority values has been described. The flexibility of the invention allows the system designer to program any sequence of priority logic schemes.

I claim:

1. In a data processing system, a priority logic apparatus for determining a priority order of accessing a memory, comprising:
    a plurality of memory request lines coupled to a plurality of memory accessing devices for receiving memory request signals from those said memory accessing devices which require access of said memory;
    a plurality of request acknowledge lines coupled to said plurality of memory accessing devices for providing a request acknowledge signal to a corresponding memory accessing device selected;
    a first set of registers for storing a first set of priority values which are selected for a single word transfer, each of said memory accessing devices having been assigned at least one of said first set of registers to store one of said first set of priority values corresponding to it;
    a second set of registers for storing a second set of priority values which are selected for a multiple-word block segment transfer, each of said memory accessing devices capable of said multiple-word block segment transfer having been assigned at least one of said second set of registers to store one of said second set of priority values corresponding to it;
    circuit means coupled to said memory request lines, said acknowledge lines, and said first and second set of registers for comparing priority values assigned to those said memory accessing devices initiating said memory request signals, such that for each requesting memory accessing device a first priority value is selected if a request is for said single word transfer and a second priority value is selected if said request is for said multiple-word transfer;
    said circuit means for selecting a highest priority value from comparison of said selected first and second priority values and generating a request acknowledge signal to a memory accessing device corresponding to said highest priority value selected, which request acknowledge signal controls access of memory by said selected memory accessing device;
    wherein said single word transfer is achieved when said memory accessing device requesting said single word transfer achieves highest priority, and said multipleword block segment transfer is achieved as long as said memory accessing device requesting said multiple-word block segment transfer retains highest priority.

2. The apparatus as defined in claim 1, wherein said circuit means further includes a detection means for detecting a request for said single word transfer and said multiple-word block segment transfer.

3. The apparatus as defined in claim 2, wherein said first and second set of registers are programmable.

4. The apparatus as defined in claim 3, wherein said circuit means further includes switching means to select between said first set of registers and said second set of registers depending on type of transfer being requested.

5. The apparatus as defined in claim 4, wherein each of said first and second set of priority values are represented by three bits and said highest priority value is determined as a highest binary value represented by said three bits.

6. In a data processing system, a priority logic apparatus for determining a priority order of accessing a memory by a plurality of memory accessing devices, comprising:
    a plurality of memory request lines, each coupled to its corresponding memory accessing device for receiving a memory request signal from its corresponding memory accessing device;
    a plurality of request acknowledge lines, each coupled to its corresponding memory accessing device for providing a request acknowledge signal to its corresponding memory accessing device;
    a first set of registers for storing priority values, wherein each of said memory accessing devices is assigned one of said first set of registers for storing one of said priority values;
    a second set of registers for storing said priority values, wherein memory accessing devices performing multipleword block segment transfers are each assigned one of said second set of registers for storing one of said priority values;
    switching means coupled to select between said first and second registers associated with said memory accessing devices performing block segment transfers;
    circuit means coupled to said memory request lines, said acknowledge lines, said first and second set of registers and said switching means, said circuit means for:
    (a) determining the a presence of said memory request signal when present on each of said memory request lines;
    (b) determining if each said memory request signal is a request for said block segment transfers;
    (c) causing said switching means to select said first set of registers as a default register for said corresponding memory accessing device, but to select said second set registers if said request is for said block segment transfers;
    (d) comparing priority values stored in selected registers for each of said memory request lines having said memory request signal present;
    (e) selecting a highest priority value from said comparison of said priority values stored in a selected registers;
    (f) identifying which memory accessing device is associated with said highest priority value selected; and
    (g) generating an acknowledge signal on a respective request acknowledge line of a respective memory accessing device associated with said highest priority value;
    wherein a second priority value is assigned during block segment transfers for said memory accessing devices.

7. The apparatus as defined in claim 6, wherein said first set of registers is selected during a single word transfer and said second set of registers is selected during said multiple-word block segment transfers.

8. The apparatus as defined in claim 7, wherein said first and second set of registers are programmable such that priority values can be changed.

9. The apparatus as defined in claim 8, wherein said circuit means further includes a positional priority circuit for selecting a single memory accessing device when said comparison of said priority values results in more than one memory accessing device having said highest priority value.

10. The apparatus as defined in claim 9, wherein request acknowledge signals are not generated during a memory refresh cycle.

11. The apparatus as defined in claim 10 is integrated within a single semiconductor device.

12. In a semiconductor integrated circuit (IC) used in a computerized system, said IC coupled to a memory, wherein a priority logic circuit within said IC is for determining a priority order of accessing said memory by processors coupled to said memory comprises:
   a plurality of memory request lines for providing memory request signals, a corresponding memory request line being coupled to each said processor and each processor generating its request signal when memory access is required;
   a plurality of request acknowledge lines for providing request acknowledge signals, a corresponding request acknowledge line being coupled to each said processor and each said processor receiving its request acknowledge signal when memory access is granted;
   a plurality of registers for storing a first and second set of priority values, wherein said first set of priority values are stored as most significant bits and said second set of priority values are stored as lower significant bits;
   each said processor having its associated register for storing priority values, such that each said processor has its first priority value which is used as its default priority, but its second priority value is used only when multiple-word block segment data transfer is required;
   a plurality of multiplexers, one coupled to each of said registers for selecting between said first priority value and said second priority value for each of said processors;
   a state logic circuit coupled to said memory request lines, said request acknowledge lines, said registers and said multiplexers, said state logic circuit for:

(a) determining a presence of said memory request signals on each of said memory request lines when present;
   (b) determining if each request is an initial request from its respective processor and if so, selecting said first priority value from its processor's associated register, but if not an initial request, interpreting such a continuous request as a block transfer request and selecting said second priority value from its associated register;
   (c) comparing each selected first and second priority values of each said memory request lines having said memory request signals present;
   (d) selecting a highest priority value from said comparison of selected first and second priority values;
   (e) generating a request acknowledge signal on a respective request acknowledge line of a respective processor winning priority;
   wherein a second priority value is assigned during block segment transfers.

13. The priority logic circuit as defined in claim 12, wherein said state logic circuit further includes delay means for providing said comparison in (c).

14. The priority logic circuit as defined in claim 13, wherein each of said memory request lines uses its first priority value during a single word transfer and uses its second priority value during a multiple-word block segment transfer.

15. The priority logic circuit as defined in claim 14, wherein said registers are programmable.

16. The priority logic circuit as defined in claim 15, further includes a positional priority circuit for selecting a single processor when said comparison in (c) results in more than one processor having said highest priority value.

17. The priority logic circuit as defined in claim 16, wherein said request acknowledge signals are not generated during a memory refresh cycle.

18. The priority logic circuit as defined in claim 17, wherein said first priority values are represented by three bits and said second priority values are also represented by three bits.

19. The priority logic circuit as defined in claims 12 or 18, wherein said processors comprise a graphics processor and a display processor for generating video images on a viewing screen.

20. The priority logic circuit as defined in claim 19, wherein each word of said single word transfer and each word of said multiple word block segment transfer is a 32-bit word.

21. The priority logic circuit as defined in claim 20, wherein said first set of priority values are higher in priority than said second set of priority values.

* * * * *